United States Patent
Gyorffy

(10) Patent No.: US 8,543,868 B2
(45) Date of Patent: Sep. 24, 2013

(54) DISTRIBUTED COMPUTING SYSTEM THAT MONITORS CLIENT DEVICE REQUEST TIME AND SERVER SERVICING TIME IN ORDER TO DETECT PERFORMANCE PROBLEMS AND AUTOMATICALLY ISSUE ALERTS

(75) Inventor: John Gyorffy, Vancouver (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 359 days.

(21) Appl. No.: 12/974,250

(22) Filed: Dec. 21, 2010

(65) Prior Publication Data
US 2012/0159267 A1 Jun. 21, 2012

(51) Int. Cl.
*G06F 11/00* (2006.01)

(52) U.S. Cl.
USPC ......................................... 714/47.2; 709/224

(58) Field of Classification Search
USPC .................. 714/47.1, 47.2, 55; 709/203, 224
See application file for complete search history.

(56) References Cited

U.S. PATENT DOCUMENTS

| | | | | |
|---|---|---|---|---|
| 5,459,837 A * | 10/1995 | Caccavale | ..................... | 709/226 |
| 5,506,955 A * | 4/1996 | Chen et al. | ....................... | 714/26 |
| 5,790,805 A * | 8/1998 | Bantum | ........................ | 709/248 |
| 6,205,413 B1 * | 3/2001 | Bisdikian et al. | ............... | 703/24 |
| 6,895,285 B2 * | 5/2005 | Maity | ............................. | 700/27 |
| 7,076,695 B2 * | 7/2006 | McGee et al. | ............... | 714/47.2 |
| 7,310,777 B2 * | 12/2007 | Cirne | ........................... | 715/763 |
| 7,565,610 B2 * | 7/2009 | Li et al. | ......................... | 715/736 |
| 7,600,007 B1 * | 10/2009 | Lewis | ............................ | 709/223 |
| 7,623,463 B2 * | 11/2009 | Chavda | ......................... | 370/241 |
| 7,685,270 B1 * | 3/2010 | Vermeulen et al. | ........... | 709/224 |
| 7,779,101 B1 * | 8/2010 | Zahavi et al. | .................. | 709/223 |
| 7,895,475 B2 * | 2/2011 | Kulkarni et al. | ............. | 714/47.1 |
| 8,166,544 B2 * | 4/2012 | Memon et al. | .................. | 726/23 |
| 8,266,479 B2 * | 9/2012 | Chan et al. | ................... | 714/47.1 |
| 8,316,127 B2 * | 11/2012 | Dahl | ............................. | 709/224 |
| 8,316,381 B2 * | 11/2012 | Fearn et al. | ................... | 719/318 |
| 2002/0091817 A1 * | 7/2002 | Hill et al. | ...................... | 709/224 |
| 2002/0152432 A1 * | 10/2002 | Fleming | ......................... | 714/47 |
| 2002/0184575 A1 * | 12/2002 | Landan | ......................... | 714/47 |
| 2003/0065986 A1 * | 4/2003 | Fraenkel et al. | ................ | 714/47 |
| 2004/0215768 A1 * | 10/2004 | Oulu et al. | .................... | 709/224 |
| 2004/0236757 A1 * | 11/2004 | Caccavale et al. | ............ | 707/100 |
| 2006/0005086 A1 * | 1/2006 | Stephenson et al. | ............ | 714/47 |
| 2006/0090209 A1 * | 4/2006 | Garay et al. | ..................... | 726/26 |
| 2006/0221851 A1 * | 10/2006 | Klein et al. | ................... | 370/252 |
| 2006/0253745 A1 * | 11/2006 | Maso et al. | ..................... | 714/47 |
| 2009/0216874 A1 * | 8/2009 | Thain et al. | ................... | 709/224 |
| 2010/0088404 A1 * | 4/2010 | Mani et al. | .................... | 709/224 |
| 2010/0306597 A1 * | 12/2010 | Goldszmidt et al. | ............ | 714/47 |

(Continued)

*Primary Examiner* — Marc Duncan
(74) *Attorney, Agent, or Firm* — Andrew T. MacMillan

(57) ABSTRACT

A client device in a distributed system may include a timer for timing a request time duration substantially including a period of time that the client device is waiting for results to be received via a network from a server in response to a request sent by the client device. A network interface may receive a value of a service time duration from the server. The service time duration may correspond to time that the server spent servicing the request. A processor may subtract the service time duration from the request time duration to thereby calculate a difference time duration, and automatically control the network interface to issue one or more alert messages to a network operation center (NOC) via the network when the difference time duration is greater than a difference time threshold. The difference time threshold may be determined according to a type of the request.

20 Claims, 9 Drawing Sheets

(56) References Cited

U.S. PATENT DOCUMENTS

2012/0023375 A1* 1/2012 Dutta et al. .................. 714/47.2
2012/0124431 A1* 5/2012 Bauer et al. .................... 714/55
2012/0159259 A1* 6/2012 Klein et al. .................. 714/38.1

* cited by examiner

Dynamic Thresholds Table

| Request type ID | Description | Request time ($T_R$) | | Service time ($T_S$) | | Difference time ($T_R - T_S$) | |
|---|---|---|---|---|---|---|---|
| | | Average | Threshold | Average | Threshold | Average | Threshold |
| 1 | Start new case | 1.5 sec | 3 sec | 1 sec | 2 sec | 0.5 sec | 1 sec |
| 2 | Open existing case | 2 sec | 4 sec | 1 sec | 2 sec | 1 sec | 2 sec |
| 3 | Search for phone number | 3.5 sec | 7 sec | 2.5 sec | 5 sec | 1 sec | 2 sec |
| 4 | Mark case as resolved | 0.5 sec | 1 sec | 0.25 sec | 0.5 sec | 0.25 sec | 0.5 sec |
| 5 | Upload case notes | 3.5 sec | 7 sec | 1 sec | 2 sec | 2.5 sec | 5 sec |
| ... | ... | ... | ... | ... | ... | ... | ... |
| N | Delete case | 1 sec | 2 sec | 0.5 sec | 1 sec | 0.5 sec | 1 sec |

FIG. 3

Client log ~136

| Case # | Request type ID | Request time ($T_R$) | Service time ($T_S$) | Difference time ($T_R - T_S$) | ... |
|---|---|---|---|---|---|
| 5677 | 1 | 0.65 sec | 0.2 sec | 0.45 sec | ... |
| 5677 | 3 | 3.3 sec | 2.1 sec | 1.2 sec | ... |
| 5677 | 3 | 3.2 sec | 2.2 sec | 1 sec | ... |
| 5677 | 4 | 0.53 sec | 0.28 sec | 0.25 sec | ... |
| 367 | 2 | 2 sec | 1.3 sec | 0.7 sec | ... |
| 367 | 3 | 3.5 sec | 2.4 sec | 1.1 sec | ... |
| 367 | 4 | 0.48 sec | 0.18 sec | 0.3 sec | ... |
| 4072 | 2 | 2.2 sec | 1 sec | 1.2 sec | ... |
| 4072 | 3 | 4.1 sec | 3.3 sec | 0.8 sec | ... |
| 4072 | 3 | 3.3 sec | 2.2 sec | 1.1 sec | ... |
| 4072 | 3 | 3.5 sec | 2.6 sec | 0.9 sec | ... |
| 4072 | 3 | 3.8 sec | 2.5 sec | 1.3 sec | ... |
| 4072 | 5 | 4 sec | 1.1 sec | 2.9 sec | ... |
| ⋮ | ⋮ | ⋮ | ⋮ | ⋮ | ... |

FIG. 4

Alert message 550

| Bits | 0 - 7 | 8 - 15 | 16 - 23 | 24 - 31 |
|---|---|---|---|---|
| 0+ | NOC address 500 ||||
| 32 | Client device address 502 ||||
| 64 | Server address 504 ||||
| 96 | Request type ID 506 || Case number ID 508 ||
| 128 | Request time duration 510 || Request time threshold 512 ||
| 160 | Service time duration 514 || Service time threshold 516 ||
| 192 | Difference time duration 518 || Difference time threshold 520 ||
| 224 | Client processing time duration 522 || Client processing time threshold 524 ||
| 256 | Database time duration 526 || Database time threshold 528 ||
| 288 | Server processing time duration 530 || Server processing time threshold 532 ||
| ⋮ | ⋮ || ⋮ ||

FIG. 5

DISTRIBUTED COMPUTING SYSTEM THAT MONITORS CLIENT DEVICE REQUEST TIME AND SERVER SERVICING TIME IN ORDER TO DETECT PERFORMANCE PROBLEMS AND AUTOMATICALLY ISSUE ALERTS

BACKGROUND OF THE INVENTION

1. Field of the Invention

The invention pertains generally to distributed computing systems. More specifically, the invention relates to monitoring client device request time and server servicing time in order to detect performance problems of a distributed computing system and automatically issue alerts.

2. Description of the Related Art

A typical distributed computing system includes client devices and servers coupled via a computer network. Clients make requests via the network, and servers process the requests and return results to the clients via the network.

One benefit of distributing a computing system using servers and clients is the convenience of being able to access data on one or more central servers from a client device physically located anywhere there is an available network connection. This convenience may further result in significant financial gains for a company taking advantage of a distributed computing system.

Distributed call centers are a good example of how distributed systems may be used to save company costs. By locating call centers in various locations throughout the world, a service company is able to take advantage of benefits such as different language abilities of local speakers, lower employment wages, and local time zones. Each call center may be responsible for handling support for a particular set of the incoming calls. For example, the various call centers could divide incoming calls according to geographic area, time periods of the day, or language requirements of the caller.

In another example, an airline company may reduce its office space overhead and employee turnover by having reservation agents operate out of their own homes. The personal residence of each reservation agent may be equipped with a client device such as a thin client computer terminal, an Internet connection, and a dedicated telephone line. The airline's reservation call system can then direct incoming passenger calls to reservation agents at their homes.

In an example unrelated to call centers, a franchisor may have many retail outlets spread over a large geographical area. To make sure sales are accurately reported for profit sharing purposes, each franchisee may be equipped with one or more point-of-sale (POS) terminals that automatically confirm purchases and track inventory in real-time with a central server. When supplies at a particular location begin to run low, a delivery truck can be automatically dispatched.

Distributed systems are so common that many people don't even realize they are using them. For example, each time a person withdraws money from an automated teller machine (ATM) or uses a credit card they are actually interacting with a distributed system client device, i.e., the ATM machine and the credit card swipe device. Inside the bank, tellers operate computer terminals that may simply be additional client devices in the same distributed system. Another example includes the Internet based World Wide Web (WWW) where a user's web browser running on a laptop is a client device and the web site is a server.

Client devices may also at times operate as servers and vice versa such as in peer-to-peer distributed systems where there is no "central" server. Instead, each client may also be a server to other clients.

Performance of a distributed system is affected by a number of factors. Server overloading can cause anything from minor delays seen at a client device while the server processes requests from other clients, to prolonged "freezes" where a client device may appear completely unresponsive to a user while it waits for a server response. Software and hardware problems at the server can have similar effects. Examples of software problems include configuration errors such as incorrectly assigned network addresses or security certificates, database problems such as missing or faulty indexes, and poor programming in general such as non-optimal algorithm design. Hardware problems can be due to failing disk drives and memory, overheating, and electrostatic and radio frequency (RF) interference, to name a few. Each of these issues may cause a server to suffer poor performance. Similar problems may also affect client devices, and the interconnecting network between a client and server may also contribute, sometimes severely, to performance problems. Computer networks typically involve interconnection between several intermediate control devices, for example, routers, gateways, and switches. These control devices can themselves become overloaded or suffer from hardware and software problems. Additionally, the various wired and wireless communication links of a network may be of different bandwidth capacities, the slowest of which will generally limit the maximum throughput and latency between a client and server.

Performance problems can wreak havoc on a distributed system, especially one that is related to customer service and operates in real-time. "Time is money" is an often used adage very applicable to performance problems in distributed systems. Taking a distributed call center system as an example, when a telephone agent spends a few minutes of each call in silence or explaining to the caller that the agent's computer is "acting up" while desperately trying to get the computer to hurry up and provide required information, this is a financial burden on the company. Customer satisfaction will be lowered and the company's reputation may suffer as a result. Sales could also be lost due to busy signals or long hold times for other callers trying to get connected with an agent. The company may only become aware of the problem when either customers or telephone agents begin complaining, at which time the company has certainly already been negatively affected. Furthermore, it may be very difficult to determine why the system is running so slow, and hiring extra telephone agents in an attempt to reduce the backlog of callers on hold may not help the situation because the extra usage of the distributed system by an increased number of agents may make it even slower.

To prevent performance problems, careful planning is needed to precisely calculate the exact technical requirements of a distributed system in order to handle the actual load. As it is nearly impossible in most practical cases to perfectly anticipate load, the typical solution is to simply over provision the whole system as much as possible and hope things don't get too slow during peak usage. However, over provisioning, especially for aspects of the system where not needed, is expensive and wasteful.

SUMMARY OF THE INVENTION

According to one aspect of the invention, there is disclosed a distributed computing system including one or more client devices and one or more servers coupled via a network. Each client device has a timer for timing a request time duration substantially including a period of time that the client device is waiting for results to be received via the network from a server in response to a request sent by the client device. A network interface is coupled to the network for receiving a value of a service time duration from the server. A processor is coupled to the timer and the network interface for subtracting the service time duration from the request time duration to thereby calculate a difference time duration, and automatically controlling the network interface to issue one or more alert messages to a network operation center (NOC) via the network when the difference time duration is greater than a difference time threshold.

According to another aspect of the invention, there is disclosed a method of detecting performance problems in a distributed computing system. The method includes timing by a client device a request time duration substantially including a period of time that the client device is waiting for results to be received via the network from a server in response to a request sent by the client device, and receiving at the client device a value of a service time duration from the server. The method further includes subtracting by the client device the service time duration from the request time duration to thereby calculate a difference time duration, and automatically issuing by the client device one or more alert messages to a network operation center (NOC) when the difference time duration is greater than a difference time threshold.

According to yet another aspect of the invention, there is disclosed a client device in a distributed computing system. The client device includes means for timing a request time duration substantially including a period of time that the client device is waiting for results to be received via the network from a server in response to a request sent by the client device, means for receiving a value of a service time duration from the server, means for subtracting the service time duration from the request time duration to thereby calculate a difference time duration, and means for automatically issuing one or more alert messages to a network operation center (NOC) when the difference time duration is greater than a difference time threshold.

These and other embodiments and advantages of the embodiments of the present invention will become apparent from the following detailed description, taken in conjunction with the accompanying drawings, illustrating by way of example the principles of the invention.

BRIEF DESCRIPTION OF THE FIGURES

FIG. 3 illustrates an exemplary table of dynamic thresholds such as may be managed by the thresholds manager of FIG. 1.

FIG. 4 illustrates an example of the client log of FIG.

FIG. 5 illustrates an exemplary alert message packet structure as may be issued to the network operations center (NOC) of FIG. 1 when a performance problem is detected.

DETAILED DESCRIPTION

Figure 1:
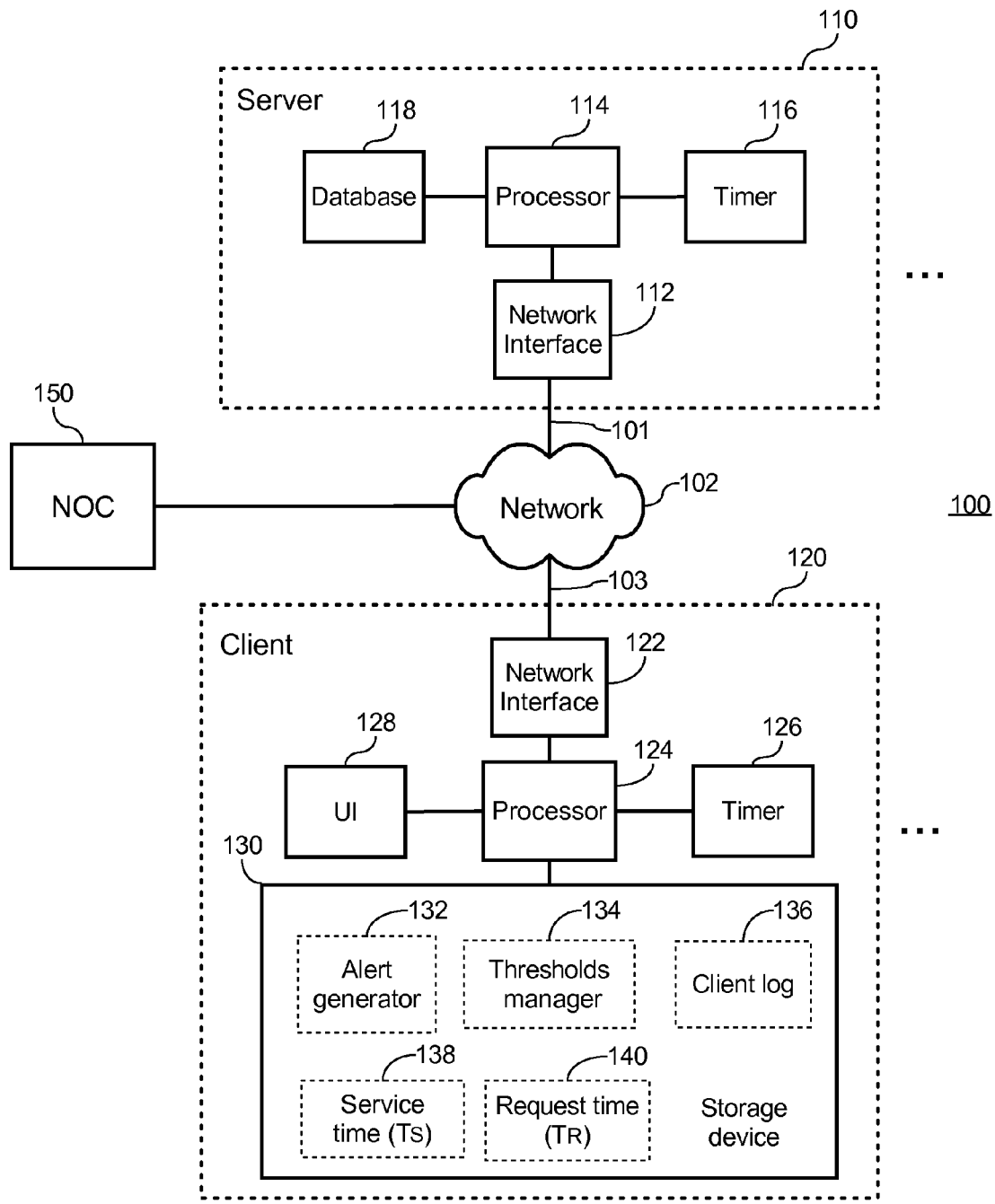
FIG. 1 illustrates a distributed computing system including one or more servers and one or more client devices coupled via a network according to a first exemplary configuration of the present invention.

FIG. 1 illustrates a distributed computing system 100 including one or more servers 110 and one or more client devices 120 coupled via a network 102 according to a first exemplary configuration of the present invention. A network operations center (NOC) 150 is coupled to the network 102 for monitoring and troubleshooting performance problems of the distributed computing system 100. In this example, in addition to their regular client functions, clients 120 monitor the performance of the network 102 and the server(s) 110 and automatically send alerts to NOC 150 when detecting potential problems.

Although the distributed computing system 100 of the present invention could be utilized for any number of applications, in the following description, the system 100 will be assumed to be a part of a distributed call center system for supporting hotel Internet connections. In this example, the server 110 may be a central server containing information related to user accounts, payment authorizations, and the Internet connectivity status at a plurality of hotels around the world; and each client device 120 may be a customer-service-agent terminal located at one of a plurality of globally situated call centers. When a guest staying at a particular hotel has a problem connecting to the Internet, the guest may call a toll free number and be automatically connected to one of the customer service agents. The agent utilizes a client device 120 to interact with the central server 110 and troubleshoot the problem for the guest. This example is chosen to help illustrate one beneficial usage of the invention; however, the invention is not limited to use in a distributed call center.

The client device 120 in this configuration is responsible for issuing alerts to NOC 150 pertaining to potential performance problems of the network 102 and server 110. The client device 120 may include a network interface 112 coupled to a processor 124, which may be coupled to a user interface (UI) 128 such as a display screen and keyboard, a timer 126 such as a hardware clock chip or counter, and a storage device 130 such as volatile and/or non-volatile memory. As shown in FIG. 1, the storage device 130 may store a plurality of software modules 132, 134 for execution by the processor 124 such as an alert generator 132 and a thresholds manager 134. Additionally, the storage device 130 may include a client log 136, temporary service time storage 138, and temporary request time storage 140 utilized by the processor 124 when executing the modules 132, 134.

The server 110 may include a network interface 112 coupled to the network 102, and a processor 114 coupled to a database 118 and a timer 116. In this usage example, the database 118 may include information related to various hotels and Internet connectivity of guests staying at each hotel.

Figure 2:
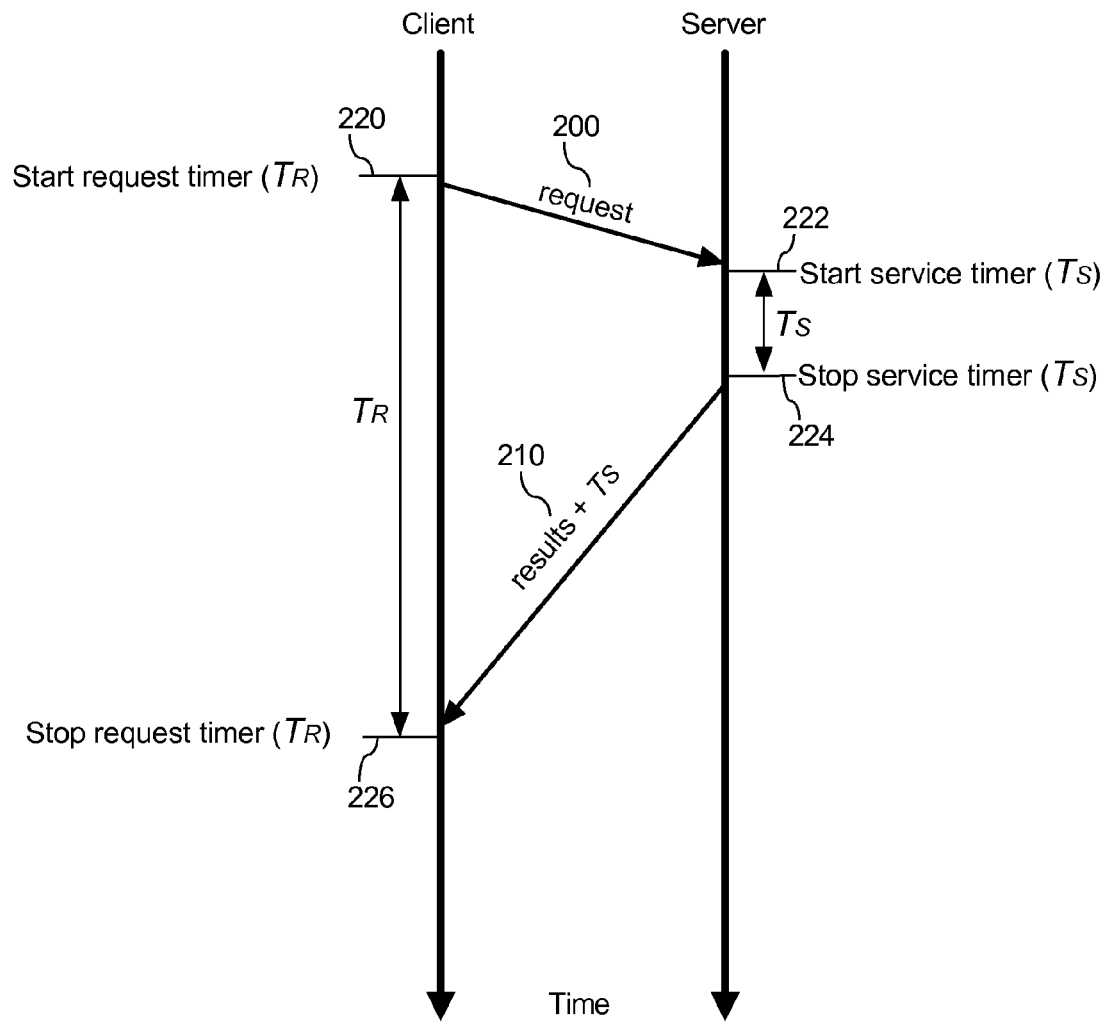
FIG. 2 illustrates an example network transaction diagram for FIG. 1 showing a request being sent from a client and results being returned by a server via the network.

FIG. 2 illustrates a network transaction diagram showing a request 200 being sent from the client 120 via the network 102 and results 210 being returned by the server 110 via the network 102 according to one example of the present invention. When the client 120 performs a distributed operation requiring information from (or providing information to) the server 110, for example, reading or storing data in the database 118, the client 120 sends a request 200 to the server 110 via the network 102. In one usage example, a customer service agent interacting with the client UI 128 may need to perform a real-time search for a caller's phone number in the central database 118. In this case, the client processor 124 controls the network interface 122 to transmit the request 200 to the server 110 via the network 102. Further, to monitor network 102 and server 110 performance, the processor 124 also utilizes the timer 126 at time point 220 to begin timing a request time duration ($T_R$), which may correspond to the period of time that the client device 120 is waiting for the results 210 to be received from the server 110.

At the server 110, upon receiving the request 200 at time point 222, the server processor 114 similarly utilizes the server's timer 116 to begin timing a service time duration ($T_S$). The request 200 may be received at the server 110 via the network 102 and passed to the processor 114 by the network interface 112. Then, when the processor 114 has finished servicing the request 200, at time point 224, the processor 114 controls the network interface 112 to send the results 210 of the request along with a resulting value of the service time duration ($T_S$) to the client 110 via the network 102. In this way, the service time duration ($T_S$) passed to the client 110 may correspond to the period of time that the server 110 spent servicing the request 200.

The server processor 114 may process any number of requests 200 simultaneously or in a multitasking manner and may utilize the timer 116 to time a separate service time duration ($T_S$) of the time taken by the server 110 to generate results 210 for each request 200. In one example, the timer 116 may be a free running hardware timer or clock, and the processor 114 may keep a start time table (not shown) of a value of timer 116 upon receiving each request 200. After finishing servicing a request 200 and when just about to send the results 210 back to the requesting client device 120, the processor 114 may calculate the service time duration ($T_S$) by subtracting the value previously stored in the start time table upon receiving the request 200 from the current value of the timer 116. In another configuration, a plurality of hardware or software timers 116 may be utilized to track a corresponding plurality service times for different requests 200. The processor 124 of the client device 120 may utilize similar techniques with the client timer 126 for timing the request time duration ($T_R$), and both the server processor 114 and the client processor 124 may time other events, e.g., operation time duration ($T_O$) and database time duration ($T_D$) explained later, using similar techniques.

The client 120 receives the results 210 and the service time duration ($T_S$) from the server 110 and stores the service time duration ($T_S$) in temporary service time storage 138. Additionally, because the results 210 of the request 200 have now been received, at time point 226 the processor 124 saves the current value of the request time duration ($T_R$) in temporary request time storage 140.

At any time afterwards, but, in order to first complete the current operation, preferably after processing the results 210 and finishing the rest of the current distributed operation, the processor 124 compares the values stored in temporary service time storage 138 and temporary request time storage 140 to detect unacceptable performance of the distributed computing system 100. In this example, a first comparison is performed by subtracting the service time duration ($T_S$) from the request time duration ($T_R$) to thereby calculate a difference time duration ($T_R$-$T_S$), which is reflective of a delay caused by the network 102 in this example. Additionally, the service time ($T_S$) itself is reflective of a delay caused by the server 110 and the request time duration ($T_R$) can be used by the client device 120 to abort and/or retry the request 200 if no results 210 are received. When a performance problem is detected, the client device 120 automatically issues one or more alert messages to NOC 150 to provide information relating to the cause of the performance problem. Further details of how the various time durations $T_R$, $T_S$, and ($T_R$-$T_S$) are utilized to detect unacceptable system 100 performance are provided below; however, first an explanation of some assumptions behind the source of performance problems in this example is provided.

There are three potential sources of performance problems in the distributed computer system 100: client 120 problems, server 110 problems, and network 102 problems. In this example, the client devices 120 may be relatively simple and dedicated purpose devices having hardware and software assumed to have been reasonably well tested before release. Client devices 120 may only be utilized by one user at a time for performing one of a plurality of well tested operations. Examples of such dedicated function client devices 120 include the customer-service-agent computer terminal in the current usage example, a credit and bank card swipe machine attached to an electronic POS cash register, a thin client terminal displaying the output of a program running on a server 110, etc. Client devices 120 of this nature may or may not include any remote access or firmware update abilities. Additionally, because it is very easy for a user to manually reset the client device 120 should they notice it malfunctioning, for example, by cycling power or other means, of the three potential sources of performance problems, server 110 problems and network 102 problems may be the more likely culprits of interest to NOC 150.

The server 110 may be responsible for simultaneously serving hundreds or thousands of client devices 120. To further complicate the maintenance of an active server 100, there may be significant differences in the behaviors of different client devices 120 due to software and firmware differences such as when the server 110 must continue to support older client devices 120 previously deployed and still in operation. In order to continue to support both new and older clients 120, the server 110 will need to handle all possible client devices 110 and software versions. The different client device 120 versions may expect data be organized in the central database 118 in different formats and the server 110 may need to convert data formats utilized by older client devices 120 to the proper format for storage in the database 118, and vice versa. As the number of concurrent versions increases, the chances that software bugs will be introduced at the server 110 likewise increases. Additionally, as servers 110 are typically multitasking devices, if too many client devices 110 make simultaneous requests 200, the server 110 may become overloaded and unable to process all requests 200 in a reasonable time, which will also cause performance problems. The server 110 may also be responsible for other tasks such as file storage, email, and/or backups, each of which may also interfere with the server's ability to process the requests 200 in a reasonable time frame.

The network 102 may suffer from similar overloading problems. For example, to save costs, it may be desirable to minimize the bandwidth of network connections. Either the network connection 101 into a data center in which the central server 110 is installed and/or network connections 103 serving each of the distributed call centers in which the client devices 120 are installed may become congested during peak usage times. In general, burst traffic or sudden demand may saturate the connections 101, 103, especially when limited bandwidth is shared by multiple users. Packets may be dropped or delayed. The same problem may be experienced at any stage along the network 102 route between the server 110 and the client device 120.

For these reasons, in the configuration of FIG. 1, each client device 120 detects delays associated with the server 120 and the network 102 and automatically issues alert messages to NOC 150 when an excessive delay is detected. Benefits of performance monitoring by the client devices 120 include the redundancy of monitoring server 110 and network 102 by multiple client devices 120 and not further burdening the server 110 with additional performance monitoring tasks. In this example, specific functionality provided at the server 110 includes the timer 116 for timing the service time duration ($T_S$) taken by the server 112 to service each request 200. As mentioned, the server 110 may also be configured to send the measured service time ($T_S$) for each request 200 back to the requesting client device 120 (i.e., either along with the results 210 or in a separate network 102 packet). Most servers 120 already include a hardware clock chip or other timing device suitable for use as timer 116. Furthermore, tracking the service time duration ($T_S$) and sending the resulting $T_S$ value to the client 120 adds only insignificant load to the server 110 and the network 102.

FIG. 3 illustrates a table of dynamic thresholds as may be managed by the thresholds manager 134 according to one exemplary configuration. As shown, each type of request 200 made by the client device 120 may have any number of dynamic thresholds for various time durations such as those shown in each of columns 304, 306, 308. Of course, the values illustrated for the thresholds in FIG. 3 are exemplary only and may be different in actual implementations.

In this configuration, the client processor 124 subtracts the service time duration ($T_S$) from the request time duration ($T_R$) in order to calculate a difference time duration ($T_R$-$T_S$). The difference time duration ($T_R$-$T_S$) is then compared with the appropriate difference time threshold in the difference time column 304, where the appropriate threshold is listed on the row that matches the type of the request 200. For example, if the request 200 corresponds to a "search for phone number", the request type ID would be "3" and the appropriate difference time threshold in column 304 would therefore be "2 seconds".

As mentioned, in the case that time points 220 and 226 in FIG. 2 substantially correspond to the times when the request 200 is transmitted and the results 210 are received, the difference time duration ($T_R$-$T_S$) will substantially correspond to the time required by the network 102 to transmit the request 200 and results 210. As different types of requests 200 may require different amounts of data be transferred to/from the client 120 across the network 102, acceptable difference time durations ($T_R$-$T_S$) may vary for each type of request 200. For example, the "start new case" type may require only a limited amount of data be transferred to or from the server 110 so the difference time threshold in column 304 is only "1 seconds". In another example, a request to "upload case notes" from the client 120 to the server 130 may involve transferring significant data across the network 102 and therefore the column 304 threshold for this type of request 200 is a more lengthy "5 seconds".

The service time duration ($T_S$) received from the server 110 may similarly be compared with the appropriate threshold in the service time column 308. Again, the appropriate threshold is listed on the table row that matches the type of the request 200. As different types of requests 200 may require the server 110 perform different actions having different amounts of load and processing time requirements at the server 110, the service time thresholds in column 308 may also be dynamically determined according to the type of request 200.

To avoid the client device 120 "freezing" when either the server 110 or the network 102 experiences a problem that causes no results 210 to be received in a reasonable time period after sending the request 200, the processor 124 may monitor the request time duration ($T_R$) and abort/retry the request 200 if $T_R$ exceeds the appropriate request time threshold in column 306 according to the type of the request 200. Again, different types of requests may have different request time thresholds in column 306 because the normal (i.e., expected) request time duration ($T_R$) for different types of request 200 may be different due to expected data transfer amount and server load.

FIG. 4 illustrates an example of the client log 136 for storing a sequence of previous requests 200, their type IDs in column 402 and their corresponding request time durations ($T_R$), service time durations ($T_S$), and difference time durations ($T_R$-$T_S$) in columns 404, 406, 408, respectively. Continuing the above described usage scenario, the log 136 may further include a case number in column 400 corresponding to a particular case that the customer service agent was working on when the request 200 was made. In this example, the case number may correspond to a tracking number used to track trouble tickets across the distributed system 100. Utilizing the historic time duration values 404, 406, 408 in the log 136, the thresholds manager 134 may further dynamically determine the thresholds of FIG. 3 according to an average of historic time durations $T_R$, $T_S$, and ($T_R$-$T_S$) for previous requests 200 of the same type as stored in the log 136. For example, as shown in FIG. 3, each threshold for a particular type of request 200 (i.e, for each row of the dynamic threshold table of FIG. 3) may be twice (or any other multiple) the average for the respective time durations $T_R$, $T_S$, ($T_R$-$T_S$) as calculated from the log.

Other methods of dynamically calculating the thresholds of FIG. 3 according to the historic values stored in the log 136 are possible. For example, the thresholds manager 134 may determine each threshold using a moving average, a maximum historic value, a minimum historic value, or any mathematical function or relationship according to the historic time values stored in the log 136. The thresholds manager 134 may be a module of computer code executed periodically by the processor 124 in order to manage (i.e., update and adjust over time) the thresholds shown in FIG. 3. The thresholds may also be dynamically determined in other ways. For example, in order to reduce false positives or to set desired monitoring delay cutoffs, an administrator or other entity (e.g., NOC 150) may transmit one or more threshold configuration messages to the client 120 via the network 102. The thresholds manager 134 may then update the thresholds of FIG. 3 according to these configuration messages.

When the difference time duration ($T_R$-$T_S$) is greater than the appropriate difference time threshold in column 304, the service time duration ($T_S$) is greater than the appropriate service time threshold in column 308, and/or the request time duration ($T_R$) is greater than the appropriate request time threshold in column 306, the processor 124 of the client device 124 may automatically execute the alert generator module 132 to issue one or more alert messages to NOC 150 regarding unacceptable performance.

FIG. 5 illustrates an exemplary alert message 550 packet structure. In a preferred configuration, when operating pursuant to the instructions of the alert generator module 132, the processor 124 may issue the alert message 550 by controlling the network interface 122 to transmit the alert message 550 to NOC 150 via the network 102. In one example, the alert message 550 may include a network operations center (NOC) address field 500 indicating the network address of NOC 150, a client device address filed 502 identifying the client device 120 that sent the request 200, and a server address filed 504 identifying the server 110 to which the request 200 was sent. To further help NOC 150 troubleshoot the system 100, the processor 124 may optionally include in the alert message 550 any additional information such as the request type identifier (in field 506) corresponding to the type of the request 200; the various measured, received and calculated time durations ($T_R$, $T_S$, $T_R$-$T_S$) in fields 510, 514, and 518, respectively; the threshold values utilized to detect unacceptable delays for each of the time durations (in fields 512, 516, 520), and/or the case number ID corresponding to the case that the agent was working upon when the request 200 was made (in field 508). As will be explained, other information such as fields 522-532 may optionally be included in the alert message 550, if applicable. The alert message 550 may also be encapsulated in another type of packet or network frame as used for transmission to NOC over the network 102, e.g., within an Internet protocol (IP) packet, Ethernet frame, transmission control protocol (TCP) packet, etc. Also, the alert message 550 may be sent to NOC 150 either directly or indirectly via any intermediary device such as one or more of the servers 110.

Figure 6:
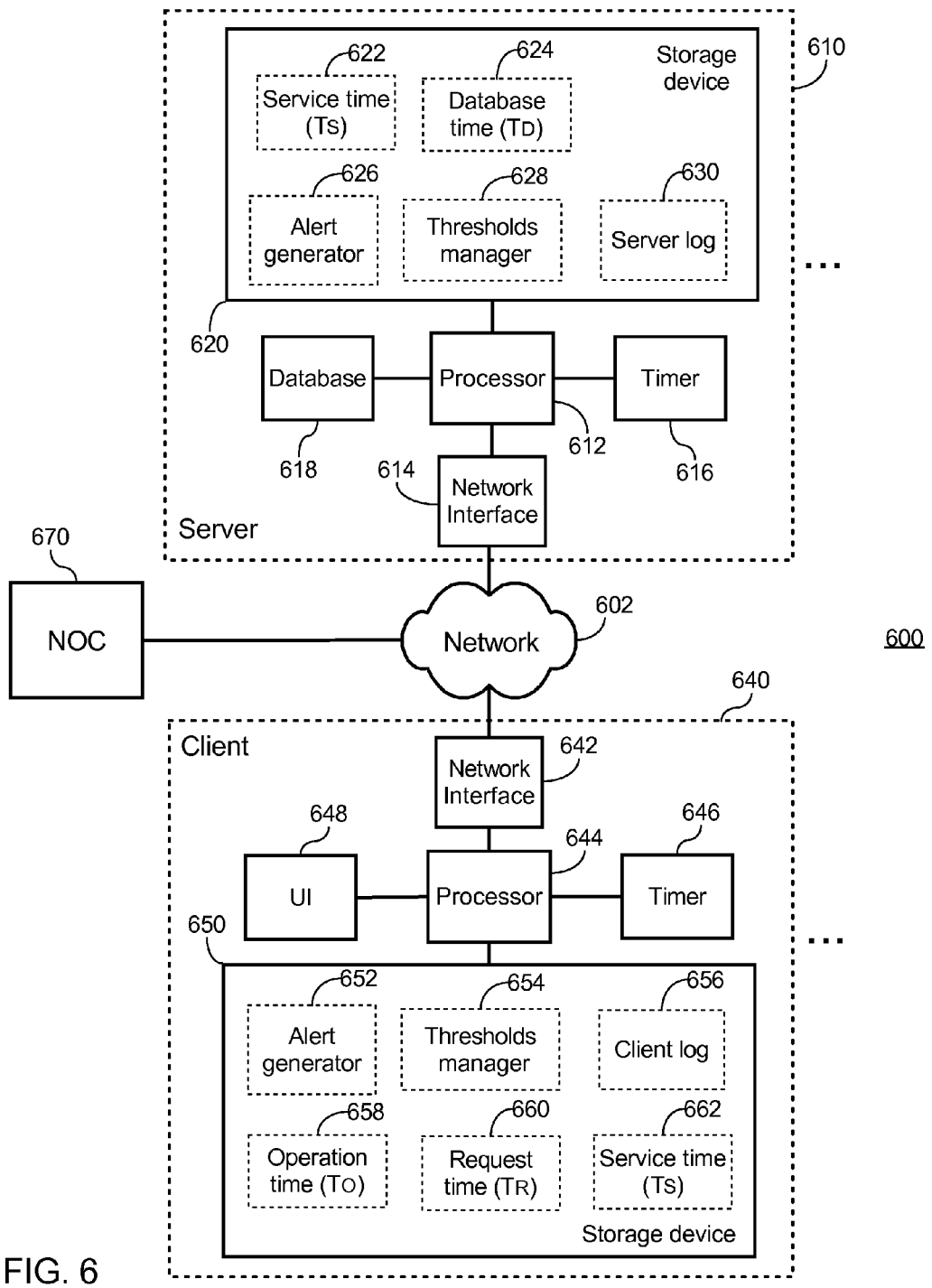
FIG. 6 illustrates a distributed computing system including one or more servers and one or more client devices coupled via a network according to a second exemplary configuration of the present invention.

FIG. 6 illustrates a distributed computing system 600 including one or more servers 610 and one or more client devices 640 coupled via a network 602 according to a second exemplary configuration of the present invention. Similar to the example of FIG. 1, a network operations center 670 is coupled to the network 602 for monitoring and troubleshooting performance problems of the distributed computing system 600. However, in this example, both the server 610 and the client device 620 monitor the performance of the system 600 and may issue automatic alert messages to NOC 670 when detecting a problem. In particular, the client device 620 automatically detects client processing delays and network delays, and the server 610 automatically detects server processing delays and database query delays.

Each client device 640 in this configuration includes a network interface 642 coupled to a processor 644. The processor 644 is in turn coupled to a user interface (UI) 648, a timer 646, and a storage device 650. The storage device 650 may store a plurality of modules 652, 654 for execution by the processor 644 including an alert generator 652 and a thresholds manager 654; additionally, the storage device 650 may include a client log 656, temporary operation time storage 658, temporary request time storage 660, and temporary service time storage 662 utilized by the processor 644 when executing the modules 652, 654.

The server 610 in this example also includes a network interface 614 coupled to the network 602 and a processor 612. The processor 612 is further coupled to a database 618, a timer 616, and a storage device 620. Similar to the storage device 650 of the client device 640, the storage device 620 of the server 610 stores a plurality of modules 626, 628 including an alert generator 626 and a thresholds manager 628 for execution by the processor 612; additionally, the storage device 620 includes a server log 630, temporary service time storage 622, and temporary database time storage 624 utilized by the processor 612 when executing the modules 626, 628.

Figure 7:
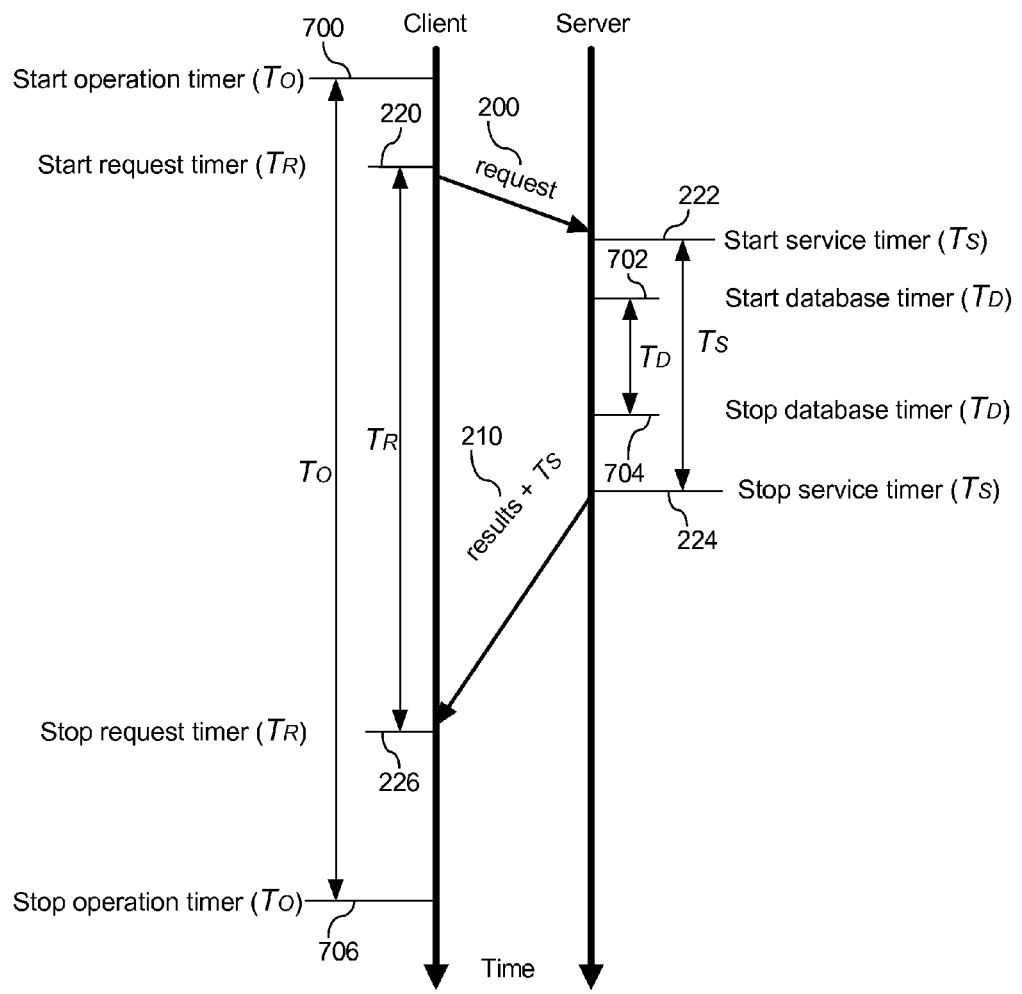
FIG. 7 illustrates an example network transaction diagram for the system of FIG. 6.

FIG. 7 illustrates an example network transaction diagram for the system 600 of FIG. 6. Similar to the network transaction diagram of FIG. 2, the client 640 sends a request 200 and times a request time duration ($T_R$) corresponding to the period of time that the client device 640 is waiting for the results 210 to be received from the server 610. The server 610 services the request 200 and sends results 210 and the service time duration ($T_S$) to the client device 640.

The client device 640 additionally begins timing an operation timer ($T_O$) at time point 700 when beginning a distributed operation that involves the client device making the request 200. An operation may be any task or sub division of a task performed by the client device 640 that involves interaction with a server 610. For example, the "search for phone number" type of request 200 shown in the dynamic thresholds table of FIG. 3 may be a part of an operation for identifying an incoming caller. The operation may involve receiving a phone number from the UI 648, formatting the phone number into a proper format, generating the request 200, sending the request 200 to the server, receiving the results 210 being a list of records in the database 624 matching the searched phone number, sorting the records into an agent-specified search order, and displaying a sorted listing on the UI 648 at time point 706. An operation could also be defined as a procedure or function call in the software or firmware of the client device 640 as executed by the processor 644.

In addition to timing the service time duration ($T_S$), the processor 612 of the server 610 further utilizes the timer 616 to time a database time duration ($T_D$) corresponding to the time that the database 624 takes to perform a query (starting at time point 702 and finishing at time point 704). For example, the time the database 618 takes to execute a stored procedure called by the query.

Figure 8:
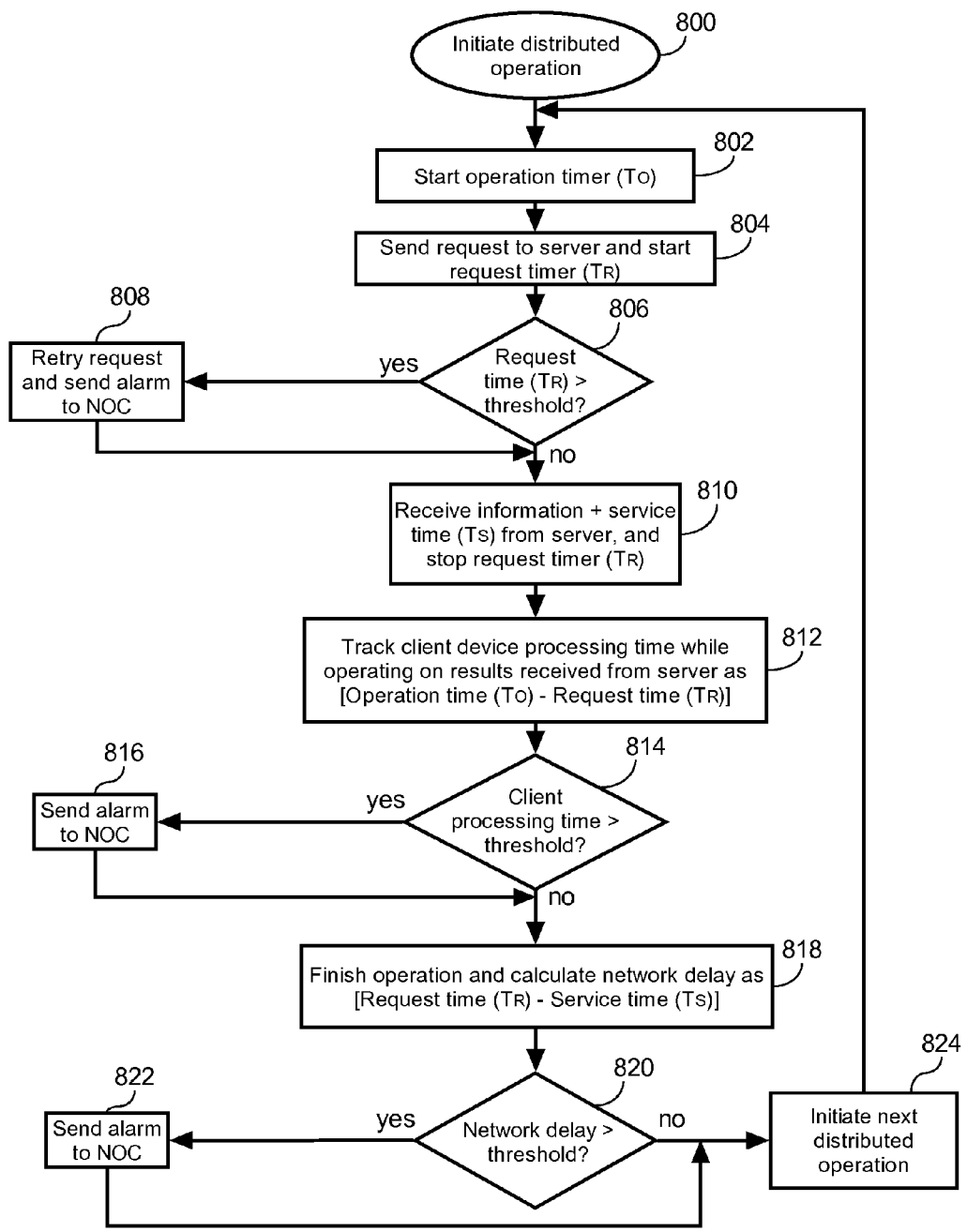
FIG. 8 illustrates an example flowchart of operational steps that may be performed by the client device of FIG. 6.

FIG. 8 illustrates a flowchart of operational steps performed by the client device 640 of FIG. 6 according to an exemplary configuration. The steps of the flowchart are not restricted to the exact order shown, and, in other configurations, shown steps may be omitted or other intermediate steps added. In this example, the client device 640 performs the following steps:

Step 800: A distributed operation is initiated by the client device 640. A distributed operation may include any procedure or function that involves sending or receiving data to/from a server 610. The division of distributed operations may be arbitrarily set by a designer of system 600 or by NOC 670, for example, in order to monitor client device 640 performance of a particular task or sub-task. Within the context of a call center agent supporting Internet connections at hotels, a distributed operation may be a frequently performed task for which a designer may with to monitor performance, e.g., providing a graphical display showing users connected to a particular hotel router. Upon initiation of the operation, the client device 640 may need to formulate a request 200 for the list of users, send it to the appropriate server 610, receive the results 210, and generate the graphical display on the UI 648. The operation may be initiated by the either the user of the client device 640 such as the call center agent, automatically by the client device 640 itself such as service task started by a cron job, or may be in response to a message received over the network 602, for example.

Step 802: The processor 644 utilizes the timer 646 for starting to time an operation time duration ($T_O$) corresponding to a period of time that the client device takes to perform the full distributed operation. For example, the processor 644 may store the current value of a free running timer 646 in a table later utilized to calculate the operation time duration ($T_O$) when the operation is finished.

Step 804: At some point in the distributed operation, the processor 644 generates a request 200 and sends the request 200 to a server 610 via the network 602. In one configuration, at approximately the same time as the request 200 is transmitted onto the network 102, the processor 644 utilizes the timer 646 to start timing a request timer ($T_R$) corresponding to the period of time that the client device 640 waits for the results 210 from the server.

Step 806: While waiting for the results 210 to be received from the network 602, the processor 644 monitors the request time duration ($T_R$) to see if it has exceed a request time threshold dynamically determined by the thresholds manager 654. For example, as shown in column 306 of FIG. 3, the request time threshold may be dynamically determined according to the type of request 200 and a moving average of previous request time durations ($T_R$) in the client log 656. If the request time duration ($T_R$) does exceed the request time threshold used in this step and no results 210 have yet been received, control proceeds to step 808; otherwise, control proceeds to step 810.

Step 808: Because the request time duration ($T_R$) has exceeded the allowable request time threshold in step 806, the processor 644 executes the alert generator module 652 to issue an alert message 550 to NOC 670. This alert message 550 may include fields 510 and 512 to indicate to NOC 670 that either the network 602 or the server 610 is experiencing a serious problem or has failed because no results 210 were received. Additionally, to avoid appearing "frozen" to a user of the client device 640, the processor 644 may abort and/or retry the request 200.

Step 810: Upon receiving the results 210 from the server 610, the processor 644 stops the request time duration ($T_R$) and saves the value in the temporary request time storage 660. Additionally, the processor 644 receives the service time duration ($T_S$) from the server 610 and stores it in the temporary service time storage 652.

Step 812: The processor 644 tracks the client processing time while utilizing the results 210 received from the server 610 to finish the operation, for example, while processing and displaying the results 210 on the UI 648. The client processing time may be calculated by the processor 644 by subtracting the request time duration ($T_R$) from the current value of the operation time duration ($T_O$) while performing the operation.

Step 814: If, at any point during the operation, the client processing time as tracked in step 812 exceeds a client processing time threshold dynamically determined by the thresholds manager 654, control proceeds to step 816; otherwise, control proceeds to step 818. Since some operations may require more client processing time than other operations, the client processing time threshold utilized in this step may be dynamically determined based on a type of the operation. Additionally, the client log 656 may save a history of client processing times, and the operation time threshold may be dynamically determined based upon an average or other function of a plurality of recent values of the same type, for example.

Step 816: Because the client device 640 processing time tracked at step 812 has exceeded the allowable client processing time threshold set at step 814 by the thresholds manager 654, the processor 644 executes the alert generator module 652 to issue an alert message 550 to NOC 670. The alert message 550 may include fields 522 and 524 to indicate to NOC 670 that the client device 640 itself is experiencing a performance problem and may need to be investigated. Additional information such as the type of the operation may also be included in the alarm message 550.

Step 818: The processor 644 finishes the distributed operation and calculates a difference time duration, being equivalent and referred to as a network time duration in this example, by subtracting the service time duration ($T_S$) from the request time duration ($T_R$).

Step 820: The processor 644 compares the network time duration calculated at step 818 with a dynamic network time threshold determined by the thresholds manager 654, for example, the difference time threshold of column 304 of FIG. 3 in the row corresponding to the type of the request 200. If the network time duration exceeds the difference time threshold, control proceeds to step 822; otherwise, control proceeds to step 824.

Step 822: Because the network time duration calculated at step 818 exceeds the allowable threshold determined by the thresholds manager 654 at step 820, the processor 644 executes the alert generator module 652 to issue an alert message 550 to NOC 670. The alert message 550 sent in this step may include fields 518 and 520 to indicate to NOC 670 that the network 602 is experiencing a performance problem and may need to be investigated. Additional information such as the type of the request and case number may also be included in fields 506, 508 of the alarm message 550, for example.

Step 824: The client device 640 initiates a next distributed operation and control returns to step 802.

Figure 9:
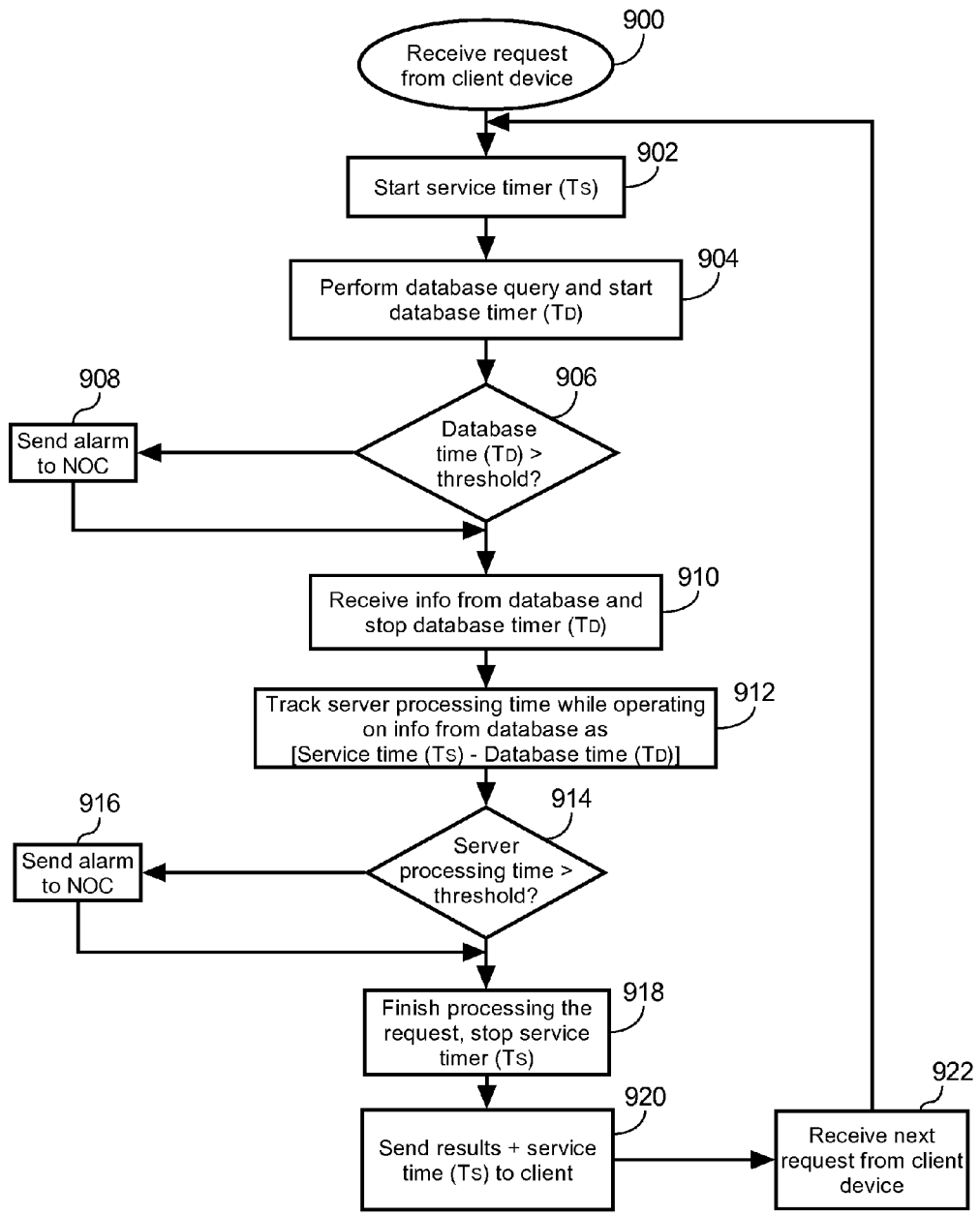
FIG. 9 illustrates an example flowchart of operational steps that may be performed by the server of FIG. 6.

FIG. 9 illustrates a flowchart of operational steps performed by the server 610 of FIG. 6 according to an exemplary configuration. The steps of the flowchart are not restricted to the exact order shown, and, in other configurations, shown steps may be omitted or other intermediate steps added. In this example, the server 610 performs the following steps:

Step 900: The server 610 receives a request 200 from a client device 640.

Step 902: After receiving the request 200, the processor 612 utilizes the timer 616 to begin timing a service time duration ($T_S$) corresponding to the time that the server 610 takes to finish servicing the request 200 and send the results 210 to the client device 640.

Step 904: The server processor 612 submits a query to the database 624 according to the request 200. This step may also involve format conversion of data included in the request 200 so that it is suitable to send to the database 624. When sending the query to the database 624, the processor 612 also utilizes the timer 616 to track a database time duration ($T_D$) corresponding to the period of time that the database 618 takes to execute the query.

Step 906: If at any time while waiting for the database 624 to execute the query the database time duration ($T_D$) tracked in step 904 exceeds a database time threshold managed by the thresholds manager 628, control proceeds to 908; otherwise, control proceeds to step 910. The database time threshold in this step may be dynamically determined automatically by the thresholds manager 628 according to a type of database query. For example, searching for particular information in the database may typically take a different amount of time than dropping a table and therefore different database time thresholds may be used. Also, similar to the average values per request type shown in FIG. 3, the thresholds manager 628 may dynamically determine the database time threshold utilized in this step according to the type of the query and a moving average of previous times for that query type as stored in the server log 630.

Step 908: Because the database time duration ($T_D$) has exceeded the database time threshold dynamically determined by the threshold manager 628 at step 906, the processor 612 executes the alert generator module 626 to issue an alert message 550 to NOC 670. This alert message 550 may include fields 526 and 528 to indicate to NOC 670 that the database 618 is experiencing a performance problem and may need to be investigated. Additional information such as the type of the database query may also be included in the alarm message 550.

Step 910: The processor 612 receives the queried information from the database and saves the resulting value of the database time duration ($T_D$) in temporarily database time storage 624.

Step 912: The processor 612 tracks the server processing time while operating on the information received from the database at step 910 and generating the results 210. The processor 644 may calculate the server processing time while finishing servicing the request 200 by subtracting the database time duration ($T_D$) from the current value of the service time duration ($T_S$).

Step 914: If, at any time while servicing the request 200, the server processing time tracked at step 912 exceeds a server processing time threshold dynamically determined by the thresholds manager 628, control proceeds to step 916; otherwise control proceeds to step 918. Similar to the dynamic thresholds table shown in FIG. 3, the thresholds manager 628 may dynamically determine the server processing time threshold utilized in this step according to the type of the request 200 and a calculation involving previous server processing times of the same type as stored in the server log 630.

Step 916: Because the server processing time duration tracked at step 912 has exceeded the service processing time threshold dynamically determined by the threshold manager 628 for step 914, the processor 612 executes the alert generator 626 to issue an alert message 550 to NOC 670. This alert message 550 may include fields 530 and 532 to indicate to NOC 670 that the server 610 is experiencing a performance problem and may need to be investigated. Other fields such as the request type ID 506 and case number ID 508 may also be included to help NOC further correlate the problem.

Step 918: The processor 612 finishes servicing the request 200 and saves the resulting service time duration ($T_S$) in temporary service time storage 622.

Step 920: The processor passes the results 210 and the service time duration ($T_S$) as stored in the temporary service time storage 622 to the requesting client device 640.

Step 922: A next request 200 is received from the network interface 612 and control returns to step 902.

It should also be noted that steps of the flowchart shown in FIG. 8 may be modified to match the above described operations of the client device 120 of FIG. 1. For example, FIG. 8 may be modified by replacing steps 812-814 with new steps to compare the service time duration ($T_S$) received from the server 110 with a service time threshold dynamically determined by the thresholds manager 134 such as shown in column 308 of FIG. 3. Alternatively, these new steps may be added to FIG. 8 such the client device(s) 640 may also check the service time duration ($T_S$) received from the server. This may be beneficial as a redundant measure in the event that the server 610 fails to issue an alert message corresponding to the server's delay. Other combinations of the illustrated steps of FIG. 8 and FIG. 9 performed by either one of or both the client devices 120, 640 and/or the servers 110, 610 are also possible. Additionally, different time durations other than or in addition to $T_O$, $T_R$, $T_S$, $T_D$ may be measured and compared with dynamic thresholds in a similar way, for example, file server access times, wireless transmission times, or any other process that takes place at the client and/or server.

Concerning the timing of events utilizing the timers 116, 126, 616, 646, it is not a requirement that the various time durations $T_O$, $T_R$, $T_S$, and $T_D$ start and end exactly in sync with their respective events. For example, the request time duration ($T_R$) as shown in FIG. 2 and FIG. 7 may start before the request 200 is transmitted due to delays in a network protocol stack on the client 120, 640. Alternatively, the request time duration ($T_R$) could start slightly after the request 200 has been transmitted on the network 602 due to starting the timer after sending the request 200. Likewise, the service time duration ($T_S$) may be slightly off the exact times that the request is received 200 and the results sent 210. In general, the closer the request time duration ($T_R$) corresponds to the period of time between the transmission of the request 200 and the reception of the results 210, and the closer the service time duration ($T_S$) corresponds to the time spent by the sever 110, 610 between receiving the request 200 and sending the results 210, the more accurately the difference time duration ($T_R$-$T_S$) will reflect network delay; however, it is not a requirement of the invention that these time durations $T_R$, $T_S$ exactly match their corresponding events. Similar comments also apply to $T_O$ and $T_D$ and any other time durations measured or calculated.

In fact, as long as the request time duration ($T_R$) substantially includes the period of time between sending the request 200 and receiving the results 210, the client device 120 may detect at least network 102 delays by comparing the difference time duration ($T_R$-$T_S$) with an appropriate threshold. Additionally, in another example, FIG. 2 may be modified such that the request time duration ($T_R$) is measured similar to how the operation time duration ($T_O$) is measured in FIG. 7. That is, in addition to including the time between sending the request 200 and receiving the results 210, the request time duration ($T_R$) may include any amount of client processing time before transmitting the request 200 and any amount of client processing time after receiving the results 210. In this way, the difference time duration ($T_R$-$T_S$) will be reflective of both network 102 delays and client device 120 delays. Although alerts 550 sent by the client device 120 may not be as specific as described above for FIG. 6, this configuration may be beneficial for its simplicity while allowing the client device 120 to send alerts to NOC 150 when any of client 120, network 102, or server 120 delays are detected.

One advantage of the present invention is that a distributed system 100, 600 may self-monitor in order to detect performance problems and then automatically send NOC 150, 670 one or more alert messages 550 that specifically inform NOC 150, 670 of potential aspect(s) of the distributed system 100, 600 that may be causing the problem. This may help NOC 150, 670 diagnose and troubleshoot the problem. For example, rather than getting general complaints from users that client terminals 120, 640 often run "slow" and trying to prevent problems by over provisioning the whole distributed system, NOC 150, 670 may receive automated alert messages 550 specifically indicating whether a problem is likely a network delay and/or a server delay such as in the example of FIG. 1; or a network delay, a client delay, a server delay, and/or a database delay such as in the example of FIG. 6. A designer may modify the examples provided to automatically monitor any other combination of events and automatically send alerts. These automated alert messages 550 may help NOC 150, 670 quickly troubleshoot and solve the actual problem before a user is bothered enough to even make a complaint.

Because the thresholds utilized according to the invention may be dynamically determined according to the types of the requests, operations, and database queries, for example, NOC 150, 670 may zero in on the actual types that may need to be checked. For example, a performance problem with a certain type of operation may be indicative of an algorithm problem with that operation, while a performance problem with a particular type of database query may be indicative of a faulty query, missing indexing or other database problems. NOC 150, 670 or another authorized user may also dynamically adjust the various thresholds to avoid false positives or to make monitoring of certain events more sensitive. Furthermore, either the client devices 120, 640 and/or the servers 110, 610 may log previous time values for server, client, and/or network delays. In this way, the thresholds may be dynamically determined based on an average time for each type of event. If the average is a moving average, sudden changes which might be indicative of the onset of a problem may be easily identified while still allowing slow fluctuations. To prevent slow but continuous degradations from causing the moving average to grow without detecting a problem, the thresholds may also be capped at a maximum allowable value, which may be adjusted by NOC 150, 670 using a threshold configuration message sent via the network 102, 602.

Another advantage of the invention involves allowing NOC 150, 670 to correlate performance problems of the distributed system 100, 600 with particular cases by including information identifying on what case a user of a client device 130 was operating when the performance problem occurred. One example is the case ID number field 508 in the alert message 550 illustrated in FIG. 5. Case numbers may relate to purchase orders, support cases, trouble tickets, telemarketing targets, customer identities, airline and other travel itineraries, etc. By including the case ID number 508 in the alert message 550, NOC 150, 670 may be able to correlate performance problems with problematic cases that may need to be investigated. For example, a particular large case may be very complicated and contain excessive amounts of data. The transfer of this large amount of data across the network 102, 602 may trigger some alert messages 550 related to network performance. However, the same types of requests when performed on other cases may not trigger the alerts. By including the case number ID filed 508 in the alert messages 550, NOC 150, 670 may thereby determine that the problem is actually with the case data being too large and not a true network performance problem. Rather than upgrading the network 102, 602, NOC 150, 670 may be able to save costs and solve the performance problem by splitting the single large case into one or more smaller cases, for example.

Furthermore, the automatic sending of alert messages 550 to NOC 150, 670 may allow the entire troubleshooting process to occur in the background without involving the users of the client devices 120, 640. This may be beneficial because user complaints are often incomplete as users may have no idea why the system 100, 600 is running slowly.

Logging the client, server, database and/or networking times (i.e., $T_O$, $T_R$, $T_S$, $T_D$) for various types of operations, requests, and other events may also allow companies to understand how much time events actually take in order to help define work flow. For example, in a distributed call center, from monitoring the logs 136, 630, 656, it may become apparent that at very minimum a single call will take forty seconds to complete because the average times of the minimum actions at the client device 120 performed by the call center agent when answering a call add up to forty seconds. Additionally, some operations such as performing complicated searches in the central database 118, 618 may be very slow and themselves take forty seconds due to a large number of tables and typical database loads, possibly doubling the call time. In addition to attempting to optimize the database search procedures to eliminate this problem, the company may decide to change the agent's work flow to minimize the number of such slow database searches performed per call.

In summary, a client device in a distributed system may include a timer for timing a request time duration substantially including a period of time that the client device is waiting for results to be received via a network from a server in response to a request sent by the client device. A network interface may receive a value of a service time duration from the server. The service time duration may correspond to a period of time that the server spent servicing the request. A processor may subtract the service time duration from the request time duration to thereby calculate a difference time duration, and automatically control the network interface to issue one or more alert messages to a network operation center (NOC) via the network when the difference time duration is greater than a difference time threshold. The difference time threshold may be determined according to a type of the request.

Although the invention has been described in connection with a preferred embodiment, it should be understood that various modifications, additions and alterations may be made to the invention by one skilled in the art without departing from the spirit and scope of the invention. For example, circuit means could also be utilized to implement the functions of the processors 612, 644 and the modules 626, 628, 652, 654 as described for FIG. 6. For example, an application specific integrated circuit (ASIC), field programmable gate array (FPGA), or discrete components may be utilized at the client device 640 and/or server 610 to perform the various operations rather than (or in combination with) the processors 612, 644 executing software modules 626, 628, 652, 654. Similar modifications may be made to the system 100 of FIG. 1. In another modification, the applicable alert messages issued by the client device 640 in steps 808, 816, and 822 of FIG. 8 may be sent as a single alert message. Similar comments also apply to the alerts of steps 908 and 916 of FIG. 9. Alerts may also be issued on-screen or as audible sound(s) to a user of the client device 120, 640 or server 110, 610, or may be sent to NOC 150, 670 using a means other than the network 102 such as via phone connection, SMS message, radio signal etc. This may be beneficial in the even the network 102, 602 has completely failed.

It should also be noted that in the above description illustrative words such as administrator, guest, caller, customer service agent, etc are simply meant as examples of different types of users to help provide an understanding of one beneficial application of the invention; however, the present invention may be beneficial in any distributed or networked system.

The above description describes elements of a system 100, 600 that may include one or more modules, some of which are explicitly shown in the figures, others that are not. As used herein, the term "module" may also be understood to refer to computing software, firmware, hardware, and/or various combinations thereof, and may include the functionality previously described for the processors 114, 124, 612, 644. It is noted that the modules are exemplary and may also be combined, integrated, separated, and/or duplicated to support various applications. Also, a function described herein as being performed at a particular module may be performed at one or more other modules and/or by one or more other devices instead of and/or in addition to the function performed at the particular module. Further, the modules may be implemented across multiple devices and/or other components local or remote to one another, and the modules may be moved from one device and added to another device, and/or may be included in both devices.

In addition to a dedicated physical computing device, the word "server" may also mean a service daemon on a single computer, virtual computer, or shared physical computer, for example.

Additionally, all combinations and permutations of the above described features, configurations, flowchart steps, and examples are within the scope of the invention.

What is claimed is:

1. A client device that sends a request to a server via a network in a distributed computing system, the client device having comprising:
    a timer for timing a request time duration substantially including a period of time that the client device is waiting for results to be received via the network from the server in response to the request sent by the client device;
    a network interface coupled to the network for receiving a value of a service time duration from the server, the service time duration substantially corresponding to a period of time that the server spent servicing the request in order to provide the results; and
    a processor coupled to the timer and the network interface;
    wherein, after receiving the value of the service time duration for the request, the processor is configured to subtract the service time duration from the request time duration to thereby calculate a difference time duration, and to automatically control the network interface to issue one or more alert messages to a network operation center (NOC) via the network when the difference time duration is greater than a difference time threshold; and
    the processor is further configured to dynamically calculate the difference time threshold according to historic request time durations and historic service time durations respectively timed by the timer and received by the network interface for a plurality of previous requests sent by the client device.

2. The client device of claim 1, wherein:
    the previous requests sent by the client device are of a plurality of types; and
    the processor is further configured to dynamically calculate the difference time threshold according to historic time durations of only previous requests of a same type as the request.

3. The client device of claim 2, wherein the processor is further configured to dynamically calculate the difference time threshold according to an average historic difference time duration of the previous requests of the same type.

4. The client device of claim 2, wherein the processor is further configured to cap a maximum value of the difference time threshold for each of a plurality of types of requests according to one or more threshold configuration messages received via the network.

5. The client device of claim 2, wherein the processor is configured to include at least a request type identifier corresponding to the type of the request, and values of the difference time duration and the difference time threshold in the one or more alert messages.

6. The client device of claim 5, wherein:
    the client device is utilized by at least one user for operating on a plurality of cases;
    the request is made by the client device as a result of the user operating on a particular case; and
    the processor is further configured to include a case identifier corresponding to the particular case in the one or more alert messages.

7. The client device of claim 1, wherein:
    the timer is further for timing an operation time duration substantially corresponding to a period of time that the client device is performing an operation that causes the client device to make the request; and
    the processor is further configured to dynamically calculate a client processing time threshold at least according to a type of the operation and historic time durations for one or more previous operations of a same type performed by the client device, subtract the request time duration from the operation time duration to thereby calculate a client processing time duration, and transmit one or more alert messages to the network operation center (NOC) via the network when the client processing time duration is greater than the client processing time threshold.

8. The client device of claim 1, wherein the processor is further configured to dynamically calculate a service time threshold at least according to a type of the request and historic service time durations received by the network interface for one or more of the previous requests of a same type, and transmit one or more alert messages to the network operation center (NOC) via the network when the service time duration is greater than the service time threshold.

9. The client device of claim 1, wherein the processor is further configured to dynamically calculate a request time threshold at least according to a type of the request and historic request time durations timed by the timer for one or more of the previous requests of a same type, and retry the request and transmit one or more alert messages to the network operation center (NOC) via the network when the request time duration is greater than the request time threshold.

10. The client device of claim 1, further comprising:
    a storage device storing a log of request type and historic time durations for the previous requests sent by the client device, the historic time durations for the previous requests in the log at least sufficient to determine a historic difference time duration for each of the previous requests;
    wherein the processor is further configured to dynamically calculate the difference time threshold for a particular request type according to a moving averaging of the historic difference time durations for a plurality of the previous requests of the particular request type in the log.

11. A method of detecting performance problems in a distributed computing system, the method comprising:
    timing by a client device a request time duration substantially including a period of time that the client device is waiting for results to be received via the network from a server in response to a request sent by the client device;
    receiving at the client device a value of a service time duration from the server, the service time duration substantially corresponding to a period of time that the server spent servicing the request in order to provide the results;
    subtracting by the client device the service time duration from the request time duration to thereby calculate a difference time duration;
    automatically issuing by the client device one or more alert messages to a network operation center (NOC) when the difference time duration is greater than a difference time threshold; and
    dynamically calculating by the client device the difference time threshold according to historic request time durations and historic service time durations respectively timed and received by the client device for a plurality of previous requests sent by the client device.

12. The method of claim 11, further comprising:
    dynamically calculating the difference time threshold according to historic time durations of only previous requests of a same type as the request;
    wherein the previous requests sent by the client device are of a plurality of types.

13. The method of claim 12, further comprising dynamically calculating the difference time threshold according to an average historic difference time duration of the previous requests of the same type.

14. The method of claim 12, further comprising capping a maximum value of the difference time threshold for each of a plurality of types of requests according to one or more threshold configuration messages received via the network.

15. The method of claim 12, further comprising including at least a request type identifier corresponding to the type of the request, and values of the difference time duration and the difference time threshold in the one or more alert messages.

16. The method of claim 15, comprising including a case identifier corresponding to a particular case in the one or more alert messages;
 wherein the client device is utilized by at least one user for operating on a plurality of cases; and
 the request is made by the client device as a result of the user operating on the particular case.

17. The method of claim 11, further comprising:
 logging at the client device request type and historic time durations for a plurality of previous requests sent by the client device, the historic time durations for the previous requests at least sufficient to determine a historic difference time duration for each of the previous requests; and
 dynamically calculating by the client device the difference time threshold for a particular request type according to a moving averaging of the historic difference time durations for a plurality of the previous requests of the particular request type as logged.

18. The method of claim 11, further comprising:
 dynamically calculating a service time threshold at least according to a type of the request and historic service time durations received by the client device for one or more of the previous requests of a same type; and
 transmitting one or more alert messages to the network operation center (NOC) via the network when the service time duration is greater than the service time threshold.

19. The method of claim 11, further comprising:
 dynamically calculating a request time threshold at least according to a type of the request and historic request time durations timed by the client device for one or more of the previous requests of a same type; and
 retrying the request and transmitting one or more alert messages to the network operation center (NOC) via the network when the request time duration is greater than the request time threshold.

20. An apparatus comprising:
 means for timing a request time duration substantially including a period of time that the apparatus is waiting for results to be received via a network from a server in response to a request sent to the server by the apparatus;
 means for receiving a value of a service time duration the server, the service time duration substantially corresponding to a period of time that the server spent servicing the request in order to provide the results;
 means for subtracting the service time duration from the request time duration to thereby calculate a difference time duration;
 means for automatically issuing one or more alert messages to a network operation center (NOC) when the difference time duration is greater than a difference time threshold; and
 means for dynamically calculating the difference time threshold according to historic request time durations and historic service time durations respectively timed and received for a plurality of previous requests sent by the apparatus.

* * * * *